United States Patent [19]

Haas et al.

[11] Patent Number: 5,299,131
[45] Date of Patent: Mar. 29, 1994

[54] METHOD OF CORRECTING THE ROTATING SPEED OF VEHICLE WHEELS SENSED BY WHEEL SENSORS

[75] Inventors: Hardy Haas, Schwieberdingen; Manfred Meissner, Unterriexingen; Alfred Sigl, Sersheim; Andreas Schlichenmaier, Zaberfeld; Ulrich Schwabe, Ditzingen; Hans Güttler, Unterheinriet; Norbert Leibbrand, Mühlacker; Jürgen Brauninger, Stuttgart; Dieter Wörner, Pleidelsheim; Jochen Schäfer, Ludwigsburg; Frank Bedrna, Schönbühlhof, all of Fed. Rep. of Germany

[73] Assignee: Robert Bosch GmbH, Stuttgart, Fed. Rep. of Germany

[21] Appl. No.: 466,450

[22] PCT Filed: Nov. 12, 1988

[86] PCT No.: PCT/EP88/01028
§ 371 Date: Jul. 20, 1990
§ 102(e) Date: Jul. 20, 1990

[87] PCT Pub. No.: WO89/04783
PCT Pub. Date: Jun. 1, 1989

[30] Foreign Application Priority Data
Nov. 17, 1987 [DE] Fed. Rep. of Germany ....... 3738914
Apr. 15, 1988 [DE] Fed. Rep. of Germany ....... 3812570

[51] Int. Cl.$^5$ ................................................. G01P 3/42
[52] U.S. Cl. .............................. 364/426.03; 364/565; 73/510; 180/197
[58] Field of Search ....................... 364/426.01, 426.02, 364/426.03, 565; 73/488, 489, 510, 518; 180/197; 303/101, 102, 103, 111

[56] References Cited

U.S. PATENT DOCUMENTS

| | | | |
|---|---|---|---|
| 4,032,197 | 6/1977 | Kohler | 303/96 |
| 4,484,280 | 11/1984 | Brugger et al. | 364/426.03 |
| 4,566,737 | 1/1986 | Masaki et al. | 303/109 |
| 4,873,638 | 10/1989 | Shiraishi et al. | 364/426.01 |
| 4,933,855 | 6/1990 | Leiber et al. | 364/426.03 |
| 4,933,857 | 6/1990 | Hashiguchi et al. | 364/426.02 |

Primary Examiner—Thomas G. Black
Assistant Examiner—Collin W. Park
Attorney, Agent, or Firm—Felfe & Lynch

[57] ABSTRACT

Vehicle speed is measured during slip-free travel of the wheels and compared with the wheel speeds to determine correction values which correct for different wheel diameters. The correction values are used to continuously correct the wheel speeds.

26 Claims, 4 Drawing Sheets

|  | AFTER ENGINE START | AFTER 5 MIN. | AFTER 20 MIN. |
|---|---|---|---|
| ACCELERATION | ± 0.1 g | ± 0.05 g | ± 0.01 g |
| ASR CONTROL | CALCULATION AFTER 20 SEC. | CALCULATION AFTER 50 SEC. | NO CALCULATION |
| CURVE | $\triangle V \leq 1$ km/h | $\triangle V \leq 0.5$ km/h | $\triangle V \leq 0.2$ km/h |
| PEDAL POSITION | ±10% AT ZERO TORQUE | ±5% AT ZERO TORQUE | ±5% AT ZERO TORQUE |

METHOD OF CORRECTING THE ROTATING SPEED OF VEHICLE WHEELS SENSED BY WHEEL SENSORS

BACKGROUND OF THE INVENTION

It is known to measure the speed of vehicle wheels by means of sensors and to use the measured speeds to control the wheel slippage. Wheel slippage can be caused by overbraking of wheels (brake slippage), too great a drive torque (drive slippage) or by the drag torque of the engine when the friction coefficient between road and tire is too small. In an ABS, the brake slippage is controlled by changing the brake pressure In a drive slip control (ASR), the drive slippage is controlled by changing the drive torque and/or the brake. In an engine drag torque control, the slippage is controlled by changing the drive.

The tires of a vehicle may have different diameters and thus different wheel speeds can be measured at the individual wheels. This can lead to an inaccuracies in the above mentioned control procedures.

From European patent A2 0133381 to which U.S. Pat. No. 4,566,737 corresponds, it is know to detect during travel different tire diameters by difference formation of wheel speed signals and to correct the measured speed values of wheels with different tire diameters. For controlling purposes, the resulting values can be set into relation to one another.

SUMMARY OF THE INVENTION

Determining the vehicle speed in accordance with the invention ensures a very good approach to the situation.

The detection of diameter differences of the wheels and the correcting calculations are preferably carried out when there is no braking, when none of the control procedures is being carried out, when not driving through a curve (small steering angle signal or small transverse acceleration or approximately the same rotating speed at the wheels and the axles), when the vehicle acceleration or deceleration is small, when the wheels are not at all or only slightly accelerated or decelerated and/or when only a small engine torque is coupled to the driven wheels. The latter can be signaled by a small engine output torque or no connection between engine and driven wheels or, in case of an automatic transmission, when setting the lever to the "N-position." In ABS controls, the zero torque determination is not possible by means of DKV- and $n_{mot}$-scan since this is ASR-specific information.

Instead, in case of ABS control, it is possible to read in the line to the fuel consumption display (KVA) of an already present injection system (Motronic, Jetronic, or the like). The values are approximately proportional to the injection time $T_i$. Knowing the corresponding engine characteristics, it is possible to determine the engine torque from $T_i$ or KVA. The above criteria can be used in different combinations in order to determine the slippage-free wheel run. It is also possible to carry out the measuring and correcting merely in an average speed range.

The change of the dynamic wheel diameter is a non-linear function of the vehicle speed. In order to carry out a non-linear correction, a correction by means of speed-dependent correction values over the entire speed range is possible.

DETAILED DESCRIPTION OF THE PREFERRED EMBODIMENT

Figure 1:
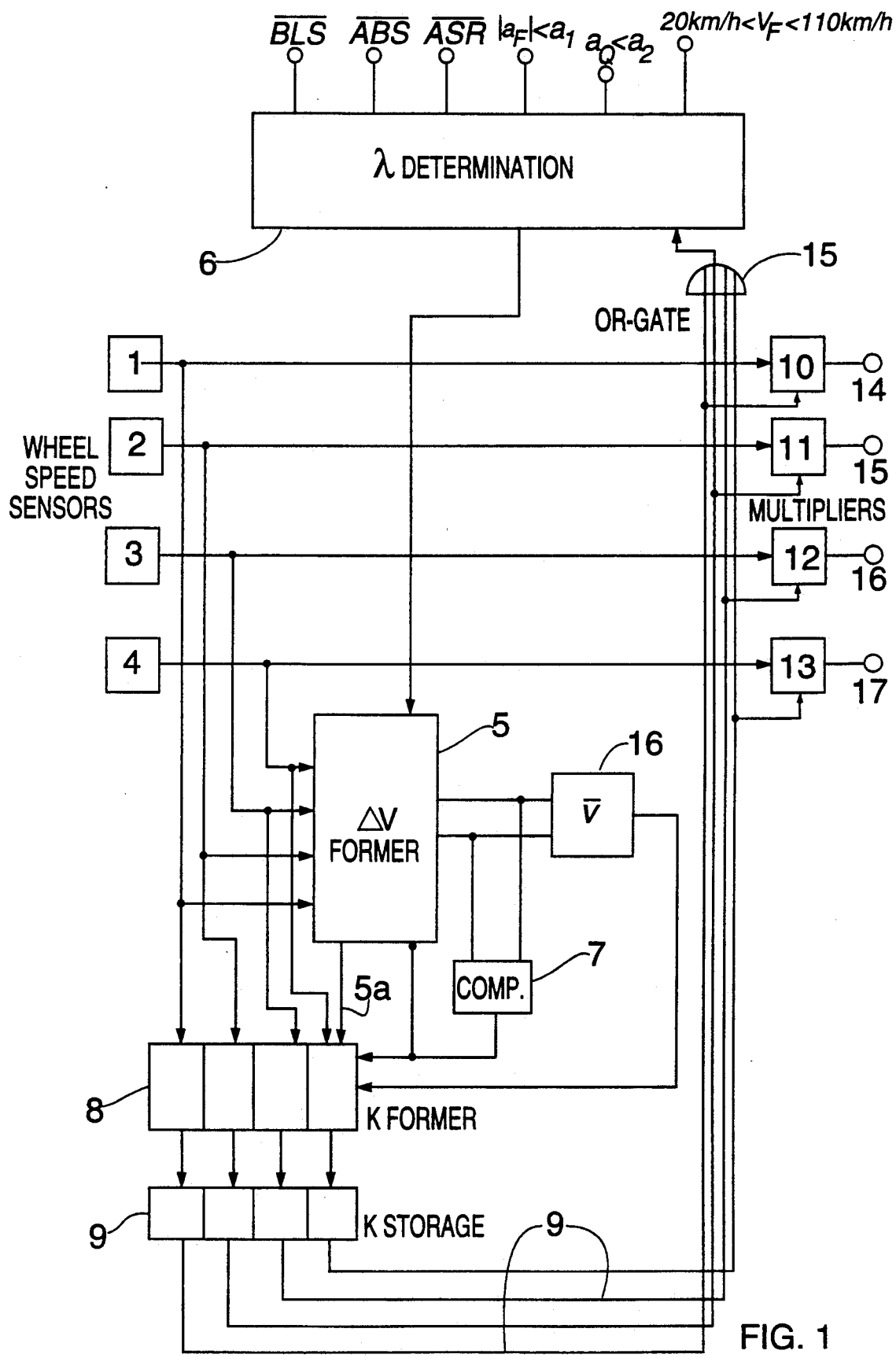
FIG. 1 is a block diagram for the working of the method in accordance with the invention.

In the FIG. 1, the speed sensors 1-4 associated with the four wheels of a vehicle supply wheel speeds $V_1$ to $V_4$ to a block 5. A further block 6 activates block 5, if, as it is assumed here, there is no braking ($\overline{BLS}$), ABS and ASR are not in operation ($\overline{ABS}$ and $\overline{ASR}$), the vehicle acceleration or deceleration is smaller by a prescribed value $a_1$, the transverse acceleration $a_Q$ is smaller than a value $a_2$ and if the vehicle moves at a speed between 20 and 110 km/h (12 and 70 mph).

If these conditions are met, a slippage free travel is assumed. It is assumed that the criterion $a_Q$ is smaller than $a_2$ and that it is added only later, prompted by a supplementary signal In block 5 the following differences are continuously formed:

$$\Delta V_1 = /(V_1 - V_2)/$$

$$\Delta V_2 = /(V_1 - V_3)/$$

$$\Delta V_3 = /(V_1 - V_4)/$$

$$\Delta V_4 = /(V_2 - V_3)/$$

$$\Delta V_5 = /(V_2 - V_4)/$$

$$\Delta V_6 = /(V_3 - V_4)/$$

and the smallest difference $\Delta V$ is determined. From the speeds, for example, $V_2$ and $V_3$ of this difference $\Delta V$ min $= \Delta V_4$, the mean value $$\overline{V} = \frac{V_2 + V_3}{2}$$

is formed in a block 16.

A mean value $\Delta V$ of the difference is preferably determined via a multiple of successive measurements in a block 5. The mean value is preferably a weighted value which is determined according to the following equation:

$$\overline{\Delta V} = \frac{m \overline{\Delta V}(t-1) + \Delta V(t)}{m+1}$$

In this equation the mean value $\overline{\Delta V}$ (t−1) which was obtained as the last value (time t−1) from the mean value formation (m-constant and e.g. 1000) is provided with the factor m and the newly (time t) determined differential value $\Delta V$ (t) is added thereto and the sum is divided by (m+1). At the start of the computation, $\overline{\Delta V}$ is zero.

According to the smallest difference $\Delta V$min resulting therefrom, those wheel speeds are selected which have the smallest difference from one another and the above said mean value $\overline{V}$ is formed in a block 16.

The comparator 7 checks whether the difference of the two selected wheels is smaller than a prescribed value, for example smaller than 1%. If this is the case, a block 8 is activated. Otherwise, the measurement is started again by deactivating block 5.

If the difference is smaller than for example 1% correction factors $$K_1 = \frac{\bar{V}}{V_1} \text{ and } K_4 = \frac{\bar{V}}{V_4}$$

(according to the above example) are formed where those wheel speeds are set into relation to $\bar{V}$, which are not included in $\bar{V}$. This is signaled from block 5 via line 5a to block 8. From the successively obtained correction values $K_1$ and $K_4$, the weighted mean values $\bar{K}_1$ and $\bar{K}_4$ are formed in block 8 according to the equations $$\bar{K}_1 = \frac{m\bar{K}_1(t-1) + K_1(t)}{m+1}$$

$$\bar{K}_4 = \frac{m\bar{K}_4(t-1) + K_4(t)}{m+1}$$

where
m is a constant number, for example 1000,
$K_i = 1$ at the beginning of the computation.

The K values can be stored in a further block 9 and be checked for plausibility. It is assumed that $K_i$ must not exceed a prescribed value $K_{limits}$, which, for example, is prescribed by the diameter of the emergency wheel.

The values $\bar{K}_1$ and $K_4$ which are determined in the assumed example are supplied by lines 9' to multipliers 10 and 13 where the corrected speeds $$V_{1K} = K_1 V_1$$

$$V_{4K} = K_4 V_4$$

are formed from the measured speeds $V_1$ and $V_4$. Via terminals 14-17, the partly corrected and partly not corrected speed signals $V_{1K}$, $V_2$, $V_3$, $V_{4K}$ are available for further evaluation.

Once the correction values were determined, it is possible to further specify the criteria for correction determination and, in addition, to add the straightforward directed travel as another condition to the determination. For this purpose, block 6 is switched via an OR-gate 15 when the correction signal $K_i$ is formed such that it activates block 5 only when straightforward directed travel is added, i.e. when $a_Q < a_2$.

Figure 2:
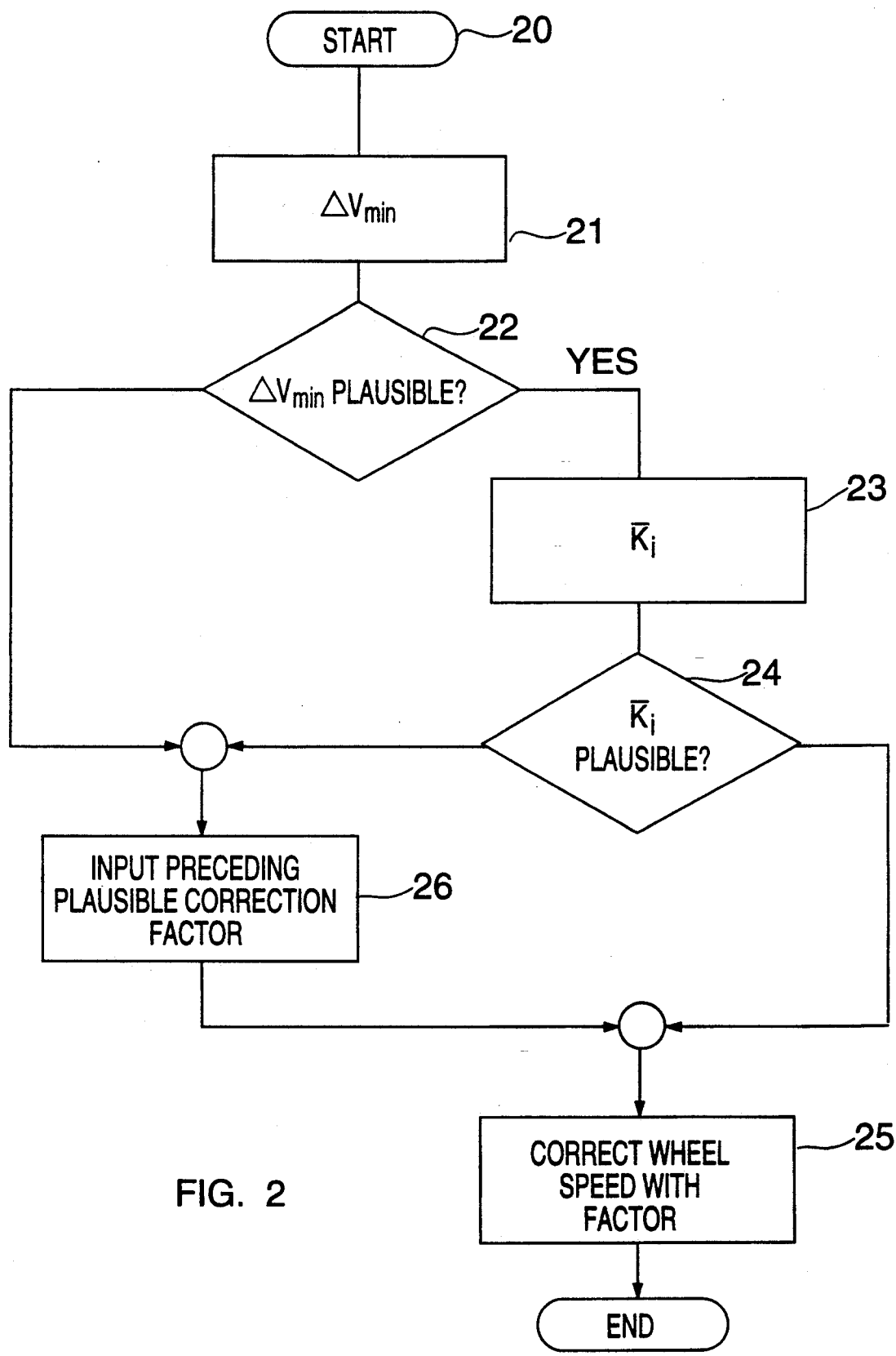
FIG. 2 is a flow diagram for the working of the method.

The full diagram of FIG. 2 now serves to explain a slightly different method. After the start 20, the smallest difference $\Delta V$min is determined in 21 and the mean value $\bar{V}$ is formed. 22 checks whether the determined values are plausible (e.g. $\Delta V$min/$\bar{V} < 1\%$). If this is not the case, the correction values K are calculated in 23 and in 24 checked for plausibility $$\left( \text{e.g. } \frac{K(t-1) - K(t)}{K(t-1)} < 3\% \right).$$

In this case, the wheel speeds are also corrected in 25. If, however, it is determined in blocks 22 or 24 that the values supplied are not plausible, the last preceding plausible correction value is used via 26 for correction.

During slippage-free travel, the wheel-specific correction values $K_i$ can be determined according to the relation $$K_i = \frac{V_F}{V_i}$$

where $V_i$ is the wheel speed of the i-th wheel and $K_i$ is the correction factor thereof. The values for $K_i$ are then stored and the measured wheel speed is continuously corrected with the stored correction value $K_i$ ($V_{i\,corr.} = K_i V_i$).

The use of the correction in accordance with the invention does not cause problems in the control system in case the tire size is changed or when snow chains, an emergency wheel or the like are used.

Figures 3, 4:
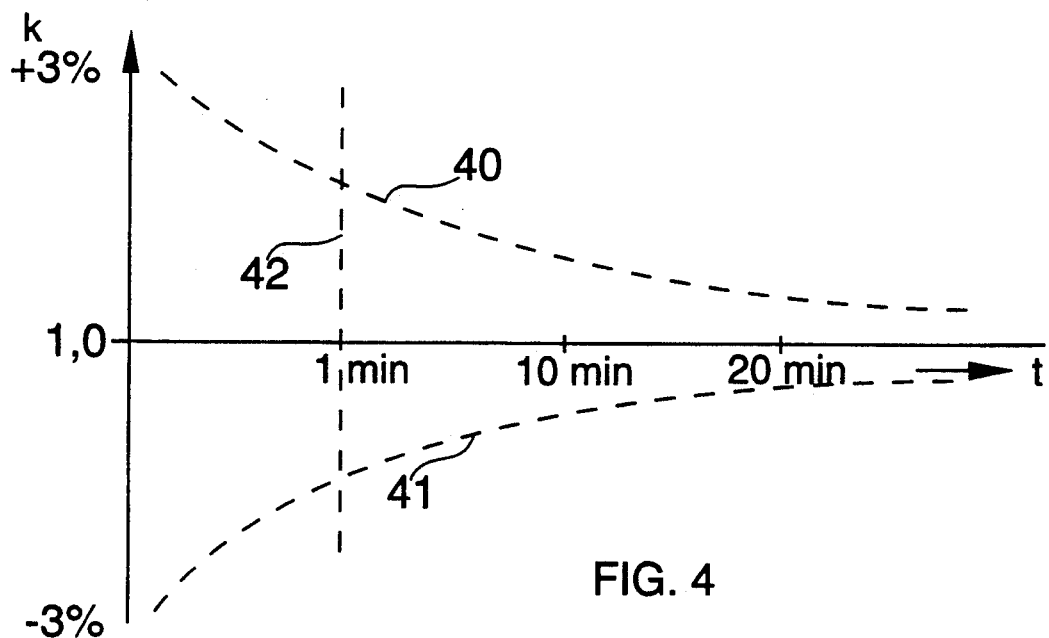
FIGS. 3 and 4 are an explanatory table and diagram, respectively.

It is possible to specify the conditions for the determination of the vehicle speed (e.g. the limits for acceleration, for the steering angle or the transverse acceleration or the difference of the wheel rotations of one axis or for the small engine torque) in dependency upon the time that has elapsed since the start or in dependency upon the number of the correction cycles that have occurred since the start. This is shown in the table of FIG. 3. Passing a curve is defined by the speed difference $\Delta V$ of the steered wheels and the pedal position defines the engine zero torque by the zero torque value.

Since it is possible that the deviation of one wheels is so big that the ASR is in operation from the start, it may be possible that there is no correction factor determination. Therefore, the system determines at the beginning after 20 sec a correction factor despite ASR. The waiting time increases with an increasing time T beginning with the start. After 20 minutes, for example, it is possible to completely omit this determination. The use of time T hence makes the determination of the vehicle speed more responsive.

A stored correction value can be replaced by a new one only if the deviation exceeds a deviation limit. This value can also be made to depend upon the time after the start such that it decreases with the time passing by. This is shown in FIG. 4 with the two limits 40 and 41. The value is stored when the newly determined value is above or below this limit. There is also another time limit included which is referenced as 42. Correction values are not replaced before 1 minute has elapsed.

Figure 5:
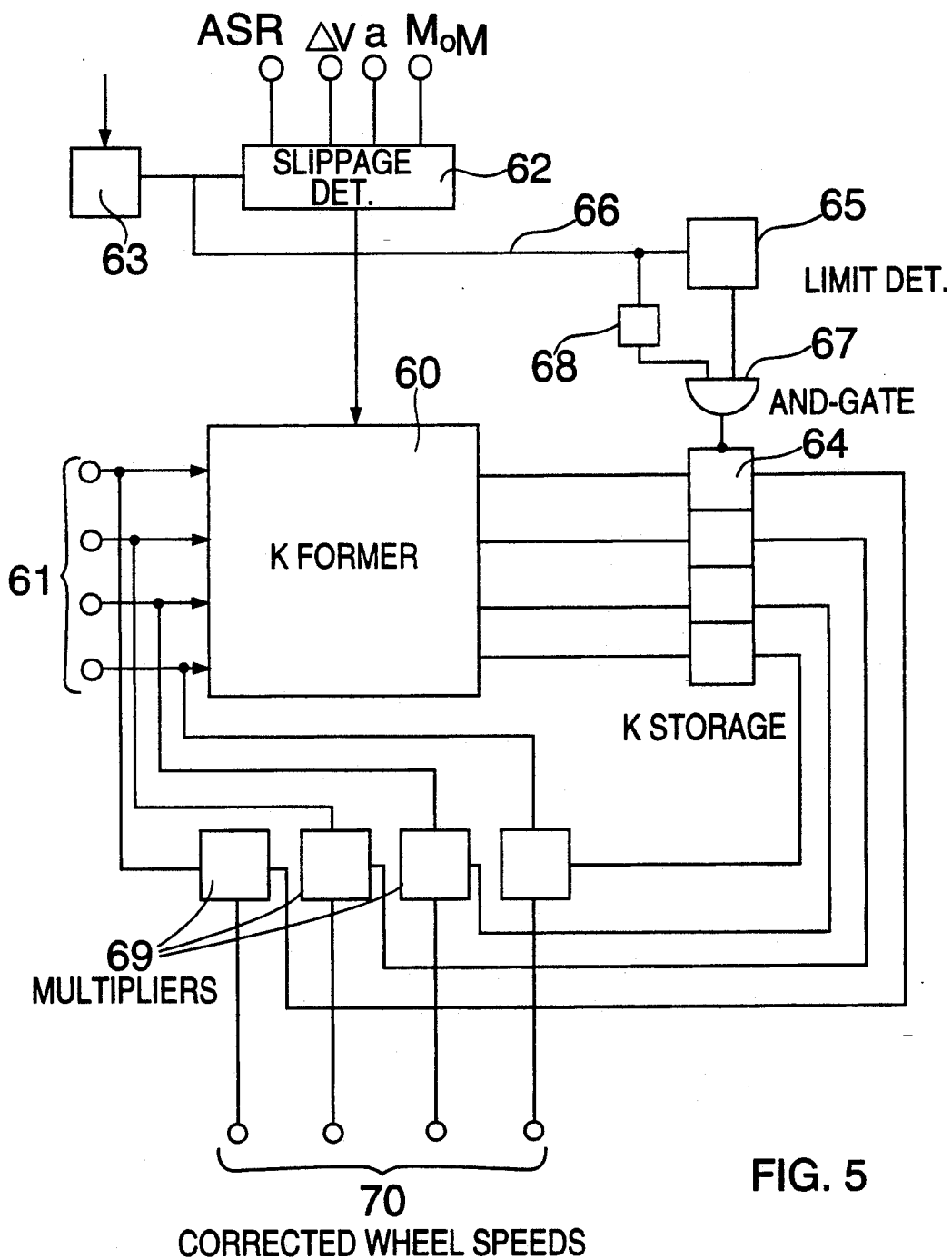
FIG. 5 is a block diagram of another embodiment.

In FIG. 5, the wheel speed are supplied via terminals 61 to a block 60 for the determination of new correction values. Block 60 determines the correction values only if it is activated by a block 62. This is done only if it recognizes slippage-free conditions from the available signals. The conditions for determining that there is no slippage can be made to depend upon the time that has elapsed since the start (cf. FIG. 3). Therefore, a time element 63 which is set at the start supplies a time signal to block 62.

If new correction factors are determined in a block 60, they are supplied to a storing and comparing element 64. Each old stored value is replaced by the new respective value if this new value deviates from the old value by at least one limit preset by a block 65. In accordance with FIG. 4, this limit is subject to variation after the start. (line 66). A limit signal and, hence, a correcting comparative value is inhibited by an AND-gate 67 as long as a minimum time has not elapsed since the start during which the time element 68 has not supplied a signal.

In multipliers 69, the continuously determined wheel speeds are multiplied with the correction factors which are ultimately stored in element 64. At a terminal 70, the corrected wheel speeds are available for evaluation in an ABS or ASR.

We claim:

1. Method for correcting the rotating speed of vehicle wheels, said method comprising the following steps:
   measuring the rotating speed of each vehicle wheel,
   determining when there is no slippage of said vehicle wheels,
   determining the difference in speed between each two vehicle wheels when there is no slippage of said vehicle wheels,
   determining the minimum said difference in speed,
   determining the average speed of the two wheels which have said minimum difference in speed, wheels other than said two wheels which have said difference in speed being remaining wheels,
   determining correction values for each said remaining wheel based on the speed of each said remaining wheel and said average speed, and
   correcting the measured speed of each said remaining wheel based on respective said correction values.

2. Method as in claim 1 wherein said determining of no slippage is made only when there is no slippage control in the operation, said slippage control comprising at least one of ABS, ASR, and engine drag torque control.

3. Method as in claim 2 wherein said differences are determined only after an elapsed time T of vehicle movement.

4. Method as in claim 3 wherein, when slippage control is detected, the correction value is determined when a waiting time has elapsed, and no further correction values are determined after said waiting time has elapsed.

5. Method as in claim 4 wherein said waiting time is increased in dependency upon time T.

6. Method as in claim 3 wherein said average speed is determined only when engine torque is below a prescribed value, said prescribed value decreasing with elapsed time T.

7. Method as in claim 3 wherein further comprising determining a vehicle acceleration, said differences being determined only when said acceleration is within prescribed limits, said prescribed limits decreasing with elapsed time T.

8. Method as in claim 3 further comprising determining a transverse vehicle acceleration and determining said differences only when said transverse acceleration is less than a prescribed value, said prescribed value decreasing with elapsed time T.

9. Method as in claim 1 wherein said average speed is determined only when there is no braking.

10. Method as in claim 1 wherein said average speed is determined only when engine torque is below a prescribed value.

11. Method as in claim 1 wherein said differences are determined only when said average speed is within a prescribed range.

12. Method as in claim 1 further comprising determining a vehicle acceleration, said difference being determined only when said acceleration is within prescribed limits.

13. Method as in claim 1 further comprising determining transverse vehicle acceleration and determining said differences only when said transverse vehicle acceleration is less than a prescribed value.

14. Method as in claim 1 wherein said wheel speed differences are determined at successive times for each two wheels, said minimum difference being determined by taking the mean of successively determined differences for each two wheels and selecting the lowest mean.

15. Method as in claim 14 wherein said means is a weighted means $\Delta V$ determined at time t according to $$\Delta V = \frac{m\Delta V(t-1) + \Delta V(t)}{m+1}$$

where m is a constant, $\Delta V(t-1)$ is the mean determined at time $(t-1)$, and $\Delta V(t)$ is the difference determined at successive time t.

16. Method as in claim 1 wherein said correction values are determined only when said wheels having said minimum difference in speed have speeds which deviate from each other by less than a prescribed value.

17. Method as in claim 1 wherein the measured speeds $V_i$ of the remaining wheels are corrected according to $V_{Ki} = K_1 V_i$ where $K_i$ is the correction value for the remaining wheel and $V_{Ki}$ is the corrected speed of the remaining wheel.

18. Method as in claim 17 wherein said correction values are determined according to $K_1 = \overline{V}/V_i$ for each remaining wheel i, where $K_i$ is the correction value for the remaining wheel i, $\overline{V}$ is the average speed of the two wheels which have the minimum difference, and $V_i$ is the speed of the remaining wheel i.

19. Method as in claim 17 wherein said correction value K is a weighted correction value $\overline{K}_i$ determined at time t according to $$\overline{K}_i = \frac{m\overline{K}_i(t-1) + K_i(t)}{m+1}$$

where m is a constant, $\overline{K}_i(-1)$ is the correction value determined at time $(t-1)$, and $K_i(t)$ is the correction value determined at successive time t.

20. Method as in claim 19 further comprising determining the deviation of $\overline{K}_i(t)$ from $\overline{K}_i(t-1)$ and limiting said deviation to a prescribed value.

21. Method as in claim 17 further comprising determining the deviation of $K_i$ from 1 and limiting said deviation to a prescribed value.

22. Method as in claim 12 wherein said prescribed value decreases with time.

23. Method as in claim 1 wherein said correction values are determined according to $K_i = \overline{V}/V_i$, where $K_i$ is the correction value for the remaining wheel i, $\overline{V}$ is the average speed of the two wheels which have the minimum difference, and $V_i$ is the speed of the remaining wheel i.

24. Method as in claim 1 further comprising
   storing said correction values for each said remaining wheel,
   newly determining correction values after said correction values are stored,
   comparing newly determined correction values to respective stored correction values, and
   replacing said stored correction values only with said new determined correction values only when said newly determined correction values exceed respective said stored correction values by respective prescribed limit values.

25. Method as in claim 24 wherein in said prescribed limit values decrease with elapsed time T of vehicle movement.

26. Method as in claim 24 wherein said stored correction values are replaced only after a minimum elapsed time after vehicle departure.

* * * * *

UNITED STATES PATENT AND TRADEMARK OFFICE
CERTIFICATE OF CORRECTION

PATENT NO : 5,299,131
DATED : March 29, 1994
INVENTOR(S): Haas et al.

It is certified that error appears in the above-identified patent and that said Letters Patent is hereby corrected as shown below:

In Column 3, line 17 of the Patent, change "$K_4$" to -- $\overline{K}_4$ --.

In Column 3, line 27 of the Patent, change "$K_i$" to -- $\overline{K}_i$ --.

In Column 3, line 32 of the Patent, change "$K_4$" to -- $\overline{K}_4$ --.

Signed and Sealed this

Sixteenth Day of June, 1998

Attest:

BRUCE LEHMAN

Attesting Officer     Commissioner of Patents and Trademarks